Dec. 17, 1957    C. GOLDBERG ET AL    2,816,392
FISH HOOK
Filed Oct. 8, 1956    2 Sheets-Sheet 1
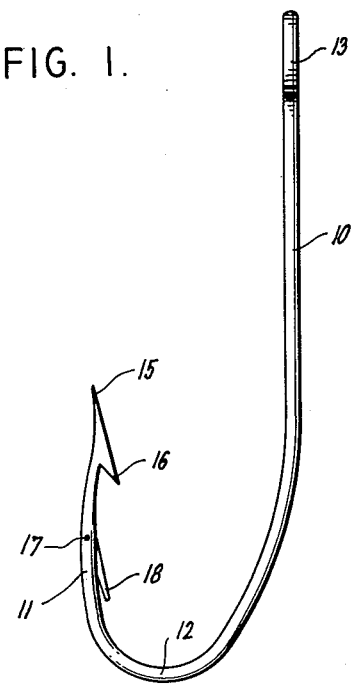
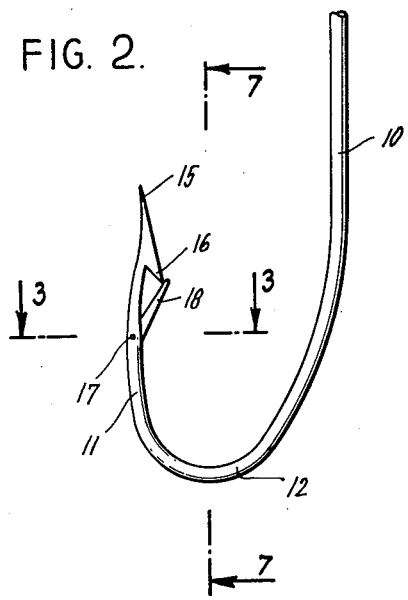
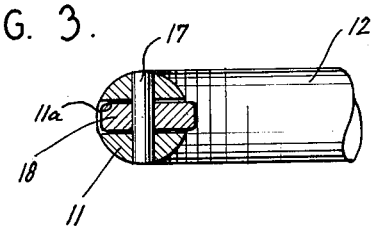
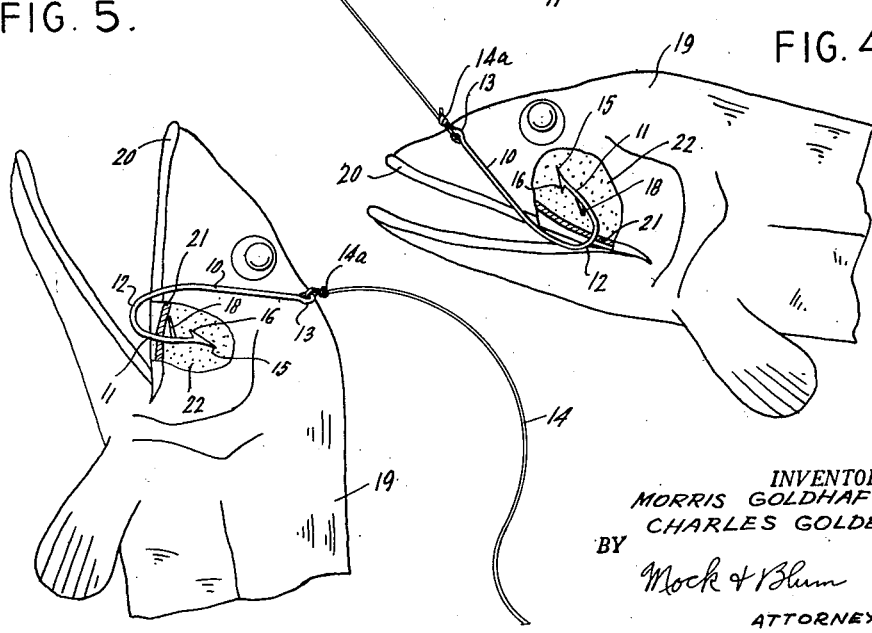
INVENTOR.
MORRIS GOLDHAFT
CHARLES GOLDBERG
BY
Mock & Blum
ATTORNEYS Dec. 17, 1957  C. GOLDBERG ET AL  2,816,392
FISH HOOK
Filed Oct. 8, 1956  2 Sheets-Sheet 2
FIG. 6.
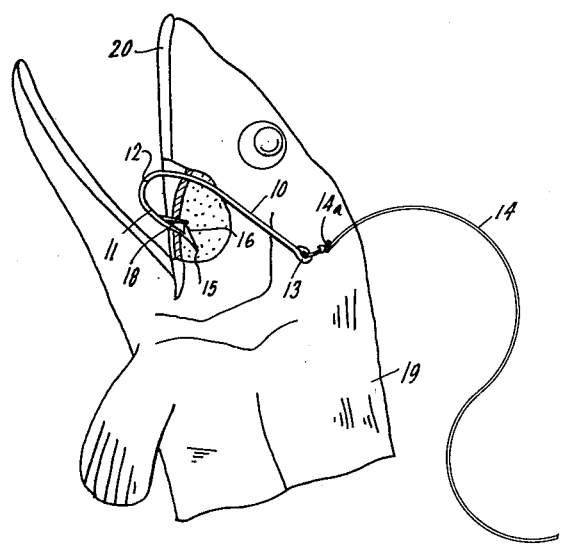
FIG. 7.
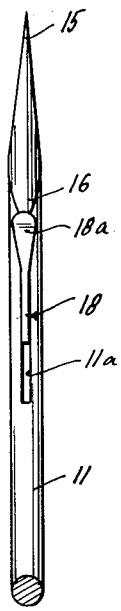
FIG. 8.
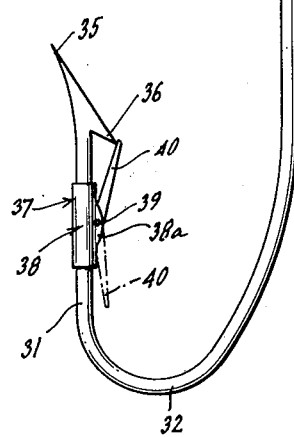
FIG. 11.
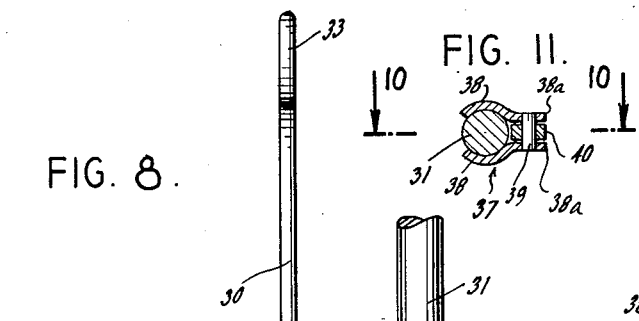
FIG. 10.
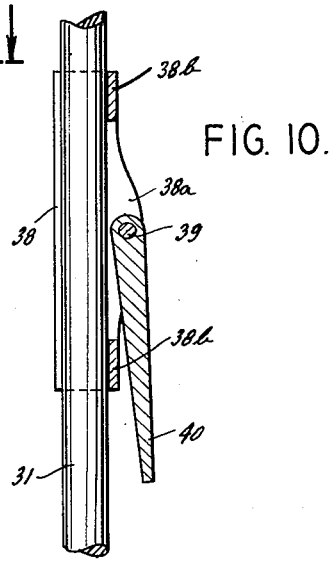
FIG. 9.
INVENTOR.
MORRIS GOLDHAFT
CHARLES GOLDBERG
BY
Mock & Blum
ATTORNEYS United States Patent Office 2,816,392
Patented Dec. 17, 1957

2,816,392
FISH HOOK

Charles Goldberg and Morris Goldhaft, Brooklyn, N. Y.

Application October 8, 1956, Serial No. 614,750

11 Claims. (Cl. 43—43.16)

This invention relates to an improvement in fish hooks, and in particular relates to an improved fish hook which may be readily removed from the fish.

One type of fish hook which is in common use today is made of steel or other ferromagnetic metal and consists of a longer shank leg and a shorter shank leg connected at their bottom ends by a bight. The upper end of the longer leg is adapted to be connected to the line. The upper end of the shorter leg is pointed. A barb is inclined downwardly outwardly from the shorter leg of the hook, somewhat below the point.

When a fish takes the bait or lure, the point and barb of the hook extend through the tough membranes lining the upper part of the mouth of the fish. This forms a fine hole in the membranes. When the fish attempts to escape, the barb catches against the membranes and prevents withdrawal of the point of the hook through the hole in the membranes.

Frequently, as a conservation measure, the fisherman is required to try to return the fish to the water alive. For example, this may occur if the fish is below minimum size. However, in withdrawing the hook, the barb commonly enlarges and makes jagged the hole in the membranes of the mouth of the fish, and this frequently results in the death of the fish.

An important object of this invention is to provide a barbed fish hook which has means for covering the barb thereof during withdrawal of the hook, said covering means being simple to construct and operable with minimum manual manipulation of the hook.

In one preferred embodiment of this invention, a lever is pivoted to the shorter leg of the fish hook at a point below the barb. This lever is optionally in the form of a small permanent magnet. The lever has a first position in which it is inclined away from the barb, with the free end of the lever spaced from the shorter leg to provide an abutment or catch. The lever is preferably pre-set in its first position before the hook is used and tends to remain in said first position as the result of its action as a magnet. The lever also has a second position in which its free end abuts the barb, the free end of the lever being shaped to cooperate with the barb to form a composite smooth surface, with no transversely projection or catch.

In the operation of the improved fish hook, the fish takes the bait or lure in the usual manner, and the point and barb of the shorter leg penetrate the membrane wall of the mouth into the flesh of the fish. The barb prevents the hook from pulling out.

In order to remove the fish from the hook, the hook is first pushed into the fish until the lever also passes through the membrane wall.

The hook is then withdrawn in the usual manner. The projecting catch on the free end of the lever engages against the membrane wall and the lever swings to its second position while the hook is being withdrawn. As a result, the hook passes smoothly through the wall, without the barb catching upon the membranes and tearing them severely.

In actual tests, we have found that fish may be caught upon our improved hook substantially as readily as on a conventional hook. We have also found that fish may be removed from the improved hook easily, and that most of the fish removed from the improved hook have survived. Thus our new hook is a great aid to fish conservation.

Another important object of our invention is to provide an improved hook which may be easily and economically made, either as a completely new article of manufacture or by conversion of existing conventional hooks.

Other objects and advantages of the invention will become apparent from the following description, in conjunction with the annexed drawing, in which preferred embodiments are disclosed.

In the drawings,

Fig. 1 is a side elevation of one embodiment of our improved fish hook, showing the lever thereof in its first position in which the barb is exposed and the hook is adapted to be used for catching fish.

Fig. 2 is a view similar to Fig. 1, but partly broken away and showing the lever in its second position in which the barb is covered during withdrawal of the hook from a fish.

Fig. 3 is a partial section on line 3—3 of Fig. 2.

Fig. 4 is a side elevation of the hook showing it engaged through the mouth membranes of a fish. The fish is shown partly broken away, and the hook is shown after the fish has been caught.

Fig. 5 is a view similar to Fig. 4, showing the hook being withdrawn from the fish, and the lever engaged against the membranes. In this view, the lever is in a position which is intermediate its first and second positions.

Fig. 6 is a view similar to Figs. 4 and 5 but showing the lever in its second position and the hook almost completely withdrawn from the fish.

Fig. 7 is a section on line 7—7 of Fig. 2.

Fig. 8 is a side elevation of a second embodiment of the invention. The lever is shown in its first position in broken lines and in its second position in full lines.

Fig. 9 is a fragmentary detail of Fig. 8, drawn to an enlarged scale.

Fig. 10 is a section on line 10—10 of Fig. 11.

Fig. 11 is a section on line 11—11 of Fig. 9.

*First embodiment*

Our improved fish hook is, of course, hook shaped, and includes a long leg 10, a short leg 11 and a bight 12 connecting the lower ends of these legs. The upper end of hook leg 10 is formed with an eye 13 to which line 14 may be secured by means of knot 14a. The upper end of leg 11 is formed with an upstanding point 15 and also with a tapered barb 16 which is inclined from leg 11 downwardly and also toward leg 10. The hook is preferably made of steel or other ferrogmagnetic material and as thus far described is preferably made in one piece.

As is clearly shown in Fig. 3, a through slot 11a is formed in leg 11 below barb 16. The axis of slot 11a is optionally transverse to leg 11 and extends toward leg 10. A pivot pin 17 extends frictionally through a bore of leg 11 and intersects slot 11a at right angles thereto. Lever 18 is in the form of a bar and has a through opening through which pin 17 extends turnably. Lever 18 is slidable within slot 11a. Lever 18 is optionally and preferably in the form of a small bar magnet.

Figs. 1 and 2 show that lever 18 is optionally tapered toward its free end. Fig. 1 shows lever 18 in a first position thereof in which lever 18 extends downwardly from pivot pin 17 and also extends toward leg 10 to an extent such that the free end portion 18a of lever 18 is slightly spaced from leg 11. However, said lever 18 is in close proximity to leg 11 along the entire length of lever 18.

Figs. 2 and 7 show lever 18 in a second position thereof in which the free end portion 18a of lever 18 abuts the tip of barb 16. As shown in Fig. 7, the lever end portion 18a is broadened and is shaped and positioned to receive the tip of barb 16.

Figs. 4, 5 and 6 illustrate the use of the improved hook in catching a fish. These views show an imaginary fish and do not necessarily illustrate the exact position of the fish upon the hook. They show a fish 19 which has a mouth 20. The upper wall of mouth 20 is shown lined with a tough membrane 21, and relatively soft and yielding flesh 22 is located above membrane 21.

In use, lever 18 is initially moved to its first position. As will be apparent without detailed description, the effect of the bar magnet lever 18 upon the ferro-magnetic material of the body of the hook causes lever 18 normally to remain in its first position. The bait or lure is placed upon the hook leg 11 and is optionally impaled upon barb 16 in the usual manner. This is conventional and is not shown.

When the fish takes the bait or lure, point 15 and barb 16 penetrate membrane 21 into the flesh 22, forming a relatively small, smooth hole in membrane 21. Barb 16 prevents the hook from pulling out. Normally, lever 18 does not penetrate membrane 21. The position of the hook when the fish is first caught is conventional, and is not shown in the drawing.

In order to separate the fish from the hook, hook 11 is first pushed further through the hole in membrane 21, to the position of Fig. 4, in which lever 18 also extends through membrane 21, into the flesh 22.

Hook leg 11 is then retracted through the hole in membrane 21. During this step, the blunt lever end portion 18a can pass through the flesh 22 but catches against membrane 21 and is pivoted toward its second position. This is shown clearly in Fig. 5.

During further retraction of hook leg 11, the lever 18 is swung completely to its second position, in which lever end portion 18a covers the tip of barb 16. This is shown clearly in Fig. 6. As a result, when the hook is completely withdrawn, the hole in membrane 21 is not enlarged and remains a smooth, clean puncture; and barb 16 does not tear a large jagged hole in the membrane. This commonly makes the difference between life and death of the fish.

The drawing of this embodiment is substantially to scale of a working model of the invention, and reference is made to said drawing to complete the disclosure herein.

*Second embodiment*

This works upon the same principle as the first embodiment, but is in the form of an attachment for an existing fish hook.

The drawing shows a fish hook having long leg 30 with eye portion 33, short leg 31, connecting bight 32, point 35 and bar 36, all conventional and all similar to the corresponding elements of the first embodiment.

An elongated clamp 37 has convex jaws 38 made of somewhat springy material. These jaws 38 are resiliently joined at one side top and bottom at 38b. Intermediate the connections 38b, jaws 38 are integral with central spaced ears 38a. Pivot pin 39 extends between ears 38a and is fixed thereto. One end of lever 40 is turnably mounted upon pin 39 and extends slidably between ears 38a.

Clamp 37 is adapted to be frictionally snapped upon hook leg 31. Lever 40 is entirely similar in shape and function to lever 18 of the first embodiment, and accordingly will not be described in detail.

It will be apparent that conventional hooks may be sold with clamp 37 or the like mounted thereon. Alternately, a fisherman may buy one or more clamps 37 and use them to modify previously purchased hooks.

For example, the invention can be applied to a plurality of ganged hooks.

It will also be apparent that an important feature of the invention resides in the ease of manipulation of the hook in order to remove it without harming the fish. This makes it possible to remove the fish from the hook as soon as it is raised from the water, without having to place the fish on a flat surface or otherwise handle it unduly. As a matter of fact, it is possible, while holding the fish by the hook, to first turn the hook in a direction such that the lever passes the membrane, and then turn the hook in the opposite direction so that the fish drops off the hook and into the watter. In this way, the fish can be returned to the water without touching it, thereby minimizing any danger of passing an infection to the fish.

It will be apparent that an important feature of both embodiments resides in the simple structure and operation of the lever. It will also be apparent that any suitable means may be provided for normally maintaining the lever in its first position. In certain instances, such biasing means may be omitted. For example, gravity may be relied upon to keep the lever in its first position. Also, the lever may be prevented from blocking the barb by regulating the position and size of the bait or lure upon the hook.

While we have disclosed preferred embodiments of the invention and have indicated various changes, omissions and additions which may be made therein, it will be apparent that various other changes, omissions and additions can be made in the invention without departing from the scope and spirit thereof.

We claim:

1. In a fish hook having a shank with a point and a barb, a freely movable lever pivoted to said shank at a point remote from said barb, said lever having a first position in which its free end is located at a point remote from said barb, said lever having a second position in which its free end covers the point of said barb, said lever extending adjacent said shank along the entire length of said lever when in its first position.

2. In a fish hook according to claim 1, means acting upon said lever to normally maintain it in its first position.

3. In a fish hook according to claim 1, said lever being in the form of a permanent magnet, said shank being made of ferro-magnetic material.

4. Blocking means for the barb of a fish hook, comprising a lever, means pivotally mounting said lever upon the shank of a barbed fish hook, said lever being movable between a first position in which its free end is spaced from said barb and a second position in which its free end covers the point of said barb.

5. Blocking means for the barb of a fish hook according to claim 4, said shank having a slot, said mounting means including a pin extending across said slot and fixed to the sides of said slot, said lever being turnably mounted upon said pin and being slidable within said slot.

6. Blocking means for the barb of a fish hook according to claim 5, said lever being in the form of a permanent magnet.

7. Blocking means for the barb of a fish hook in accordance with claim 4, said mounting means for said lever comprising a clamp adapted to be mounted upon the shank of said fish hook.

8. A fish hook comprising a shank having a point at the upper end thereof and having a pointed barb thereon below said point and inclined away from said shank, and a lever pivotally mounted upon said shank below said bar, said lever having a blunt free end which is adapted to be positioned remote from said barb when said hook is taken by a fish, said blunt end of said lever being adapted to move retractably through the soft flesh of the fish inwardly of the mouth lining membranes, and being adapted to engage the membrane upon retraction of the hook and to swing to a second position wherein it blocks the point of said barb, whereby said barb may be retracted completely through the membrane without tearing same.

9. A fish hook according to claim 8, said shank and said lever being made of ferro-magnetic material, at least one out of said lever and said shank being magnetized, said lever being adapted to be maintained by said magnetism normally in its position wherein its free end is remote from said barb.

10. A fish hook comprising a shank having a point at the upper end thereof and having a pointed barb thereon below said point and inclined away from said shank, and a lever pivotally mounted upon said shank, said lever having a blunt free end and being movable between a first position in which said free end is remote from said barb and in which said lever extends adjacent said shank, and a second position in which said free end blocks the point of said barb.

11. A fish hook according to claim 10, said fish hook also having means acting upon said lever to normally maintain it in its first position.

References Cited in the file of this patent

UNITED STATES PATENTS 1,333,148     Anderson _____ Mar. 9, 1920